United States Patent [19]
Watanabe

[11] Patent Number: 5,664,237
[45] Date of Patent: Sep. 2, 1997

[54] AUTOMATIC FOCUS ADJUSTMENT DEVICE AND METHOD

[75] Inventor: Toshimi Watanabe, Kanagawa-ken, Japan

[73] Assignee: Nikon Corporation, Tokyo, Japan

[21] Appl. No.: 517,610

[22] Filed: Aug. 22, 1995

[30] Foreign Application Priority Data

Sep. 7, 1994 [JP] Japan .................. 6-214115

[51] Int. Cl.⁶ .............. G03B 3/00; G03B 13/18; G03B 13/32
[52] U.S. Cl. .................................................. 396/96
[58] Field of Search .................. 354/406–408; 250/201.8; 396/96, 95

[56] References Cited

U.S. PATENT DOCUMENTS

| | | | |
|---|---|---|---|
| 4,835,615 | 5/1989 | Taniguchi et al. | 358/213.19 |
| 4,920,370 | 4/1990 | Taniguchi et al. | 354/402 |
| 4,979,045 | 12/1990 | Taniguchi et al. | 358/227 |
| 5,068,737 | 11/1991 | Taniguchi et al. | 358/227 |
| 5,151,732 | 9/1992 | Akashi et al. | 354/402 |
| 5,469,240 | 11/1995 | Uchiyama et al. | 354/406 |
| 5,483,318 | 1/1996 | Hamada et al. | 354/402 |
| 5,485,003 | 1/1996 | Kusada | 250/201.8 |

*Primary Examiner*—Russell E. Adams
*Assistant Examiner*—Eric Nelson
*Attorney, Agent, or Firm*—Oliff & Berridge

[57] ABSTRACT

An automatic focus adjustment device includes a photoelectric conversion device, a focus state detection device and a photoelectric conversion timing control device. The photoelectric conversion device has a plurality of areas that receive light signals from a photographic optical system and that convert the light signals into electrical signals by accumulating electric charge over accumulation time intervals. The focus state detection device, which is connected to the photoelectric conversion device, receives and detects a focus adjustment state in accordance with the electrical signals. The photoelectric conversion timing control device controls the photoelectric conversion device to match a first accumulation time interval to a second accumulation time interval. As a result, midpoint times of the accumulation time intervals need not be recorded, and memory capacity can thus be reduced.

28 Claims, 12 Drawing Sheets

AUTOMATIC FOCUS ADJUSTMENT DEVICE AND METHOD

BACKGROUND OF THE INVENTION

1. Field of the Invention

The present invention relates to an automatic focus adjustment device with a focus state detection device, and in particular, to a photoelectric conversion device having multiple areas in which the accumulation time interval of one of the areas is matched to the accumulation time interval of another area.

2. Description of Related Art

Within the field of focus state detection devices using phase difference detection, a focus state detection device of the type that includes an electric charge accumulation photoelectric conversion device having a plurality of pairs of detection areas is known. In particular, the photoelectric conversion device of this type of focus state detection device is a CCD, MOS, or other similar component. In a first known method for controlling the electric charge accumulation photoelectric accumulation device, the accumulation time interval for each area is determined completely independently of the other. In a second known method, the accumulation starting times for each area are determined to be the same. In a third known method, the accumulation ending times for each area are determined to be the same.

A focus state detection device using an electric charge accumulation type of photoelectric conversion device having a pairs of detection areas detects the average object imaging plane position repeatedly during the accumulation period. The conventional accumulation control methods described above require that the accumulation midpoint time (i.e., the time midway between the starting time and the ending time) for each of the areas be recorded. As a result, a large volume of recorded data is generated as the number of areas increases. In addition, if the accumulation midpoint times differ, e.g., as shown in FIG. 4, determining whether the image extending over row AB and row CD is a single object or two separate objects is impossible.

SUMMARY OF THE INVENTION

One object of the present invention is to provide an automatic focus adjustment device in which the accumulation midpoint times of each area of the sensor need not be recorded. Another object is to reduce the memory capacity that such a device requires.

These and other objects are achieved by the automatic focus adjustment device of the present invention. The automatic focus adjustment device includes a photoelectric conversion device, a focus state detection device and a photoelectric conversion timing control device. The photoelectric conversion device has a plurality of areas that receive light signals from a photographic optical system and convert the light signals into electrical signals by accumulating electric charge over accumulation time intervals.

The focus state detection device, which is connected to the photoelectric conversion device, receives and detects a focus adjustment state in accordance with the electrical signals. The photoelectric conversion timing control device controls the photoelectric conversion device to match a first accumulation time interval to a second accumulation time interval.

According to a first embodiment, the first accumulation time interval can be matched to the second accumulation time interval by setting a first midpoint time of the first accumulation time interval to substantially coincide with a second midpoint time of the second accumulation time interval. The first midpoint time can be set to coincide with the second midpoint time if the first accumulation time interval and the second accumulation time interval are greater than a predetermined length.

According to a second embodiment, the first accumulation time interval can be matched to the second accumulation time interval by setting the first midpoint time to substantially coincide with a starting time or an ending time of the second accumulation time interval. The first midpoint time can be set to coincide with either a starting time or an ending time of the second accumulation time interval if either one of the first and the second accumulation time intervals is greater than the predetermined length.

According to a third embodiment, the first accumulation time interval can be matched to the second accumulation time interval by setting an ending time of the first accumulation time interval to substantially coincide with a starting time of the second accumulation time interval. The ending time of the first accumulation time interval can be set to coincide with the starting time of the second accumulation time interval if the first and second accumulation time intervals are less than the predetermined length.

By matching the accumulation time intervals for multiple areas, distinguishing between differences in the object position of each area due to movement of the object and differences in the object position caused by detection of separate objects is possible.

BRIEF DESCRIPTION OF DRAWINGS

A complete understanding of the present invention may be obtained by reference to the accompanying drawings, when considered in conjunction with the subsequent detailed description thereof, in which.

DETAILED DESCRIPTION OF PREFERRED EMBODIMENTS

Figure 5:
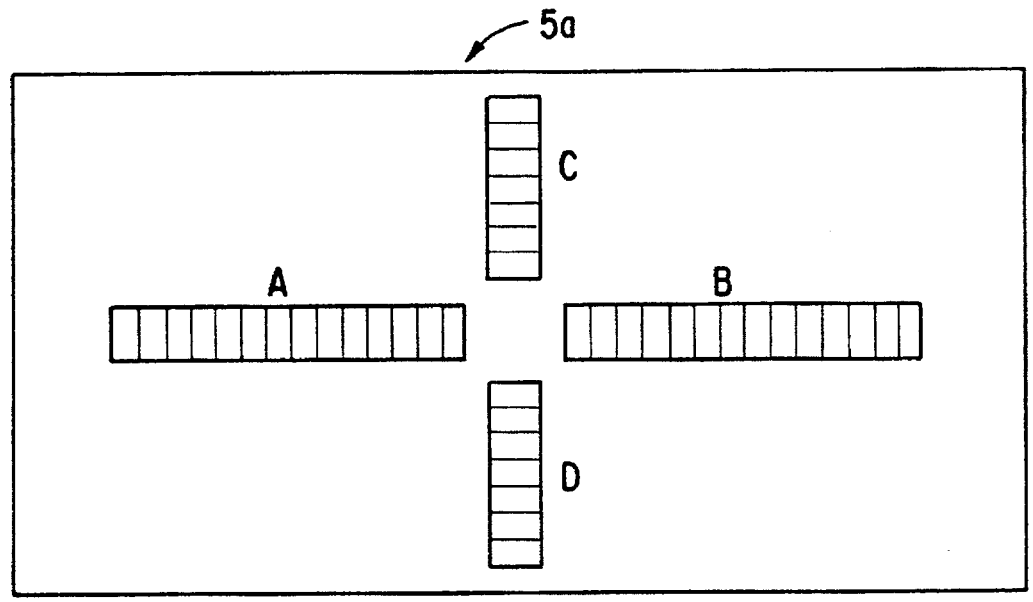
FIG. 5 is a drawing that shows how the photoelectric conversion device is arranged on the sensor.
Figure 6:
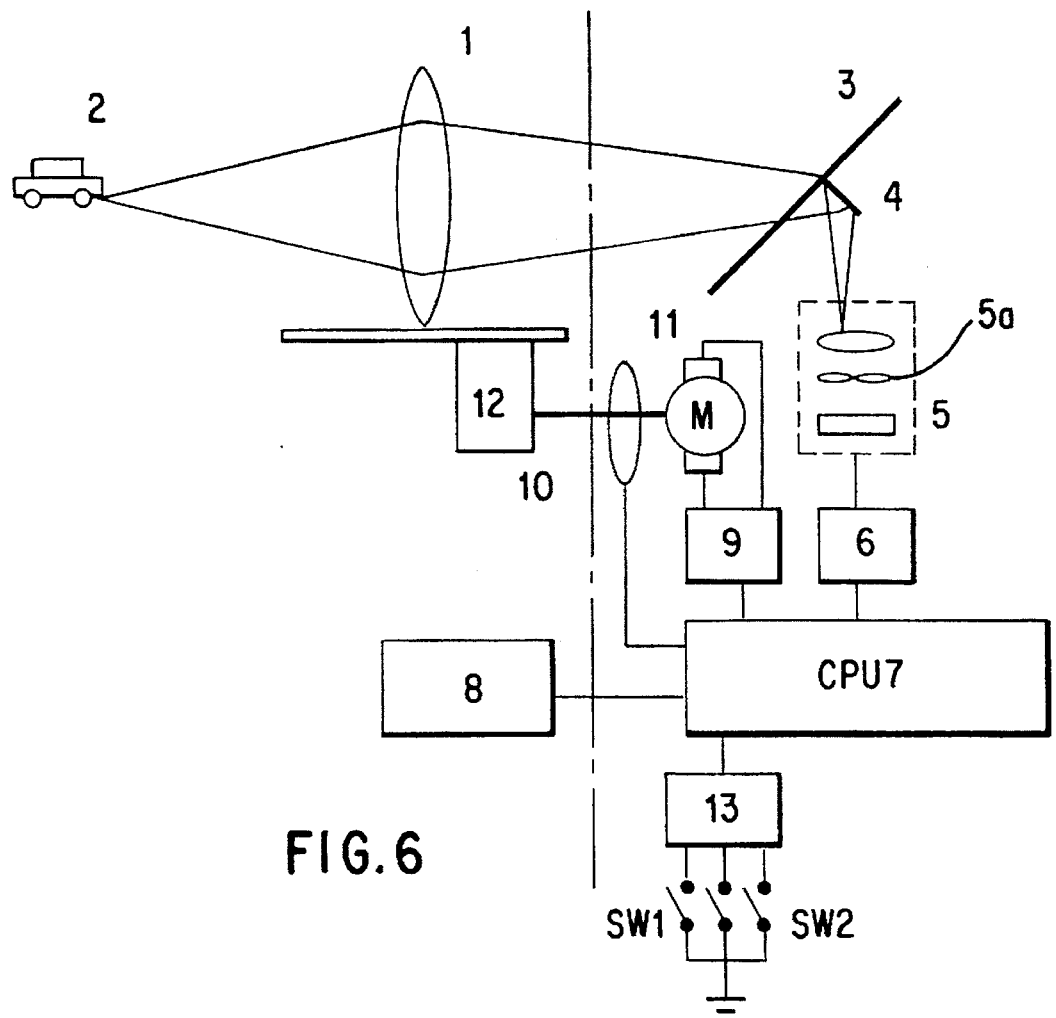
FIG. 6 is a schematic diagram of the camera that includes the automatic focus adjustment device of the present invention.

FIG. 6 is a simplified schematic diagram of the automatic focus adjustment device of the present invention configured for use in a camera having an auto-focus mechanism. A portion of the light from an object 2 that passes through a shooting lens 1 is guided to an AF module 5 by a main mirror 3 and by an auxiliary mirror 4. The portion of the light is converted by the AF module 5 into an electrical signal indicating the focus adjustment state of the shooting lens 1. The AF module 5 is a commonly known focus state detection device that includes a reimaging optical system and a sensor 5a with photoelectric conversion elements A–D as shown in FIG. 5. The AF module 5 is controlled by a sensor driving circuit 6. The electrical signal indicating the focus adjustment state undergoes A/D conversion in a controller 7 and is stored in a memory within the controller 7. A lens information memory circuit 8 stores information relating to the lens, such as the focal length of the shooting lens 1, the defocus amount/lens driving amount conversion coefficients and the like.

The lens driving amount is calculated on the basis of the data stored within the controller 7 and the defocus amount/lens driving amount conversion coefficients stored in the lens information memory circuit 8. The controller 7 controls the driving of a motor 11 based on the lens driving amount while monitoring a motor control circuit 9 and the lens driving amount or the lens position through an encoder 10. The driving force from the motor 11 is transferred through a lens movement mechanism 12 to the shooting lens 1 so that the focus condition of the shooting lens 1 can be adjusted.

An operation member 13 connected to the controller 7 includes at least two switches. A switch SW1 (hereinafter referred to as the half-depressed switch) is actuated to start the focus adjustment of the lens, and a switch SW2 (hereinafter referred to as the fully-depressed switch) is turned on when the half-depressed switch is depressed a second time. After the operation member 13 is actuated, the controller 7 executes various routines, as described below, to control the camera.

In the illustrated embodiment, the controller 7 may be implemented as a single special purpose integrated circuit (e.g., ASIC) having a main or central processor section for overall, system-level control, and separate sections dedicated to performing various different specific computations, functions and other processes under control of the central processor section. Those skilled in the art will appreciate that the controller can also be implemented using a plurality of separate dedicated or programmable integrated or other electronic circuits or devices (e.g., hardwired electronic or logic circuits such as discrete element circuits, or programmable logic devices such as PLDs, PLAs, PALs or the like). The controller can also be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowcharts shown in FIGS. 7, 8, 11, 13 and 15 can be used as the controller. As shown, a distributed processing architecture is preferred for maximum data/signal processing capability and speed.

Figure 7:
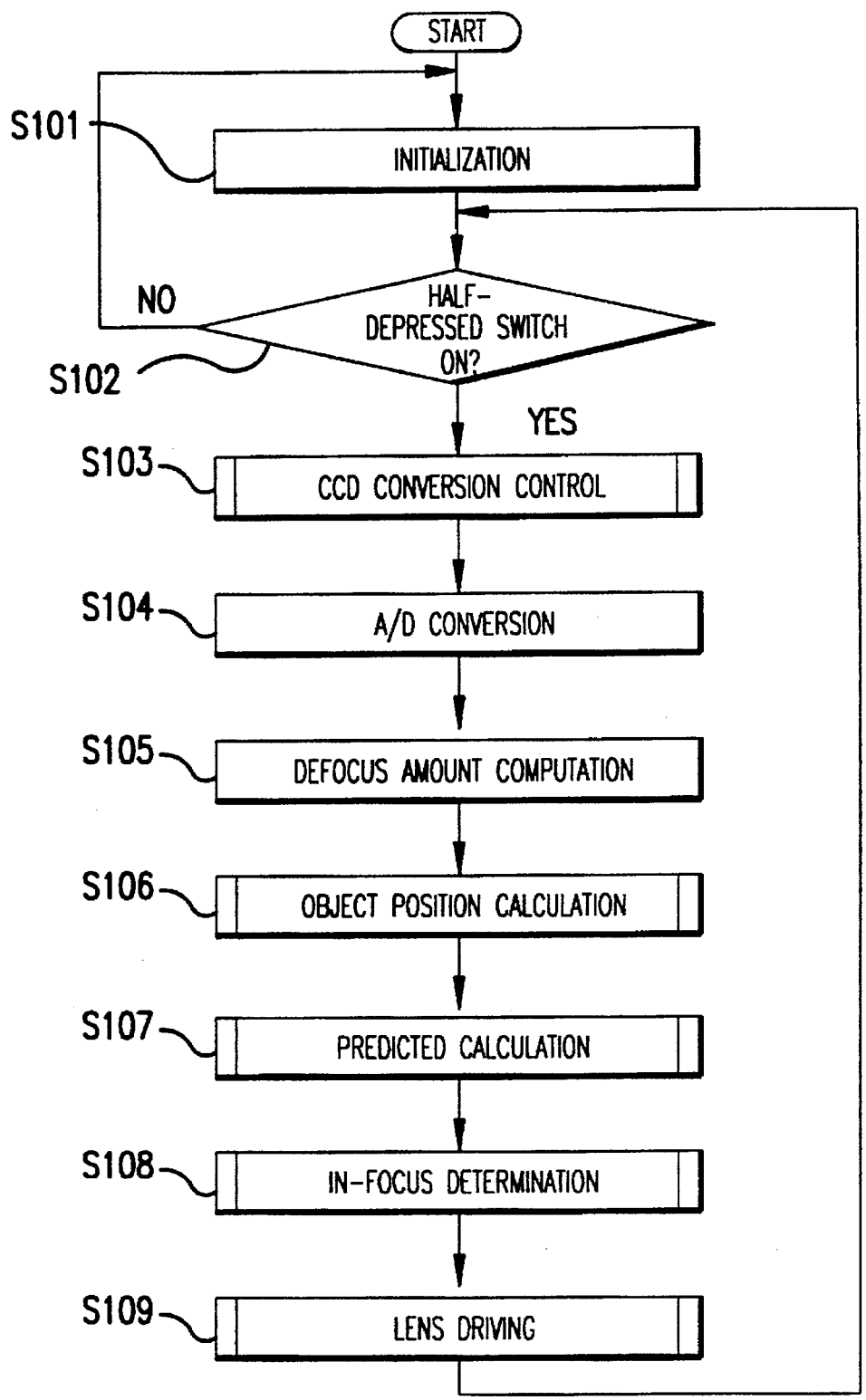
FIG. 7 is a flowchart that illustrates a main operating routine of the camera.

FIG. 7 is the main flowchart describing the operation of the present invention. In step S101, the memories and flags, including, e.g., the previously detected defocus amount, the accumulation midpoint time, the movement flag and the focus flag, are initialized. In step S102, a test is conducted to determine whether the half-depressed switch is on. If the half-depressed switch is not on, the controller 7 returns to step S101. If the half-depressed switch is on, the controller 7 advances to step S103. In step S103, an accumulation control subroutine is executed. In the accumulation control subroutine, the accumulation time intervals of each of the groups ab and cd are controlled, as detailed below, by setting the start and end times for CCD accumulation in the multiple areas. In addition, the average lens position during accumulation in each area is computed by monitoring the pulses from the encoder 10. The sensor in the AF module 5 is positioned as shown in FIG. 6.

In step S104, the analog signal that has been photoelectrically converted during the accumulation control subroutine undergoes A/D conversion and is stored in a memory connected to the controller 7. In step S105, a known defocus amount computation subroutine is executed. The defocus amounts of each of the areas (hereinafter, the area that is labeled as row AB in FIG. 5 is referred to as area 1, and the area that is labeled as row CD is referred to as area 2) are computed on the basis of the photoelectric conversion signal stored in the memory. In step S106, future movement of the object is predicted on the basis of the defocus amounts of each area computed with the defocus amount computation subroutine and the past focus state detection information that has been recorded (the defocus amount, the average lens position and the accumulation midpoint time). In step S107, a determination is made as to whether the lens is presently in focus. In step S108, the lens driving amount is calculated, and the lens is driven based on the calculated lens driving amount.

Figure 4:
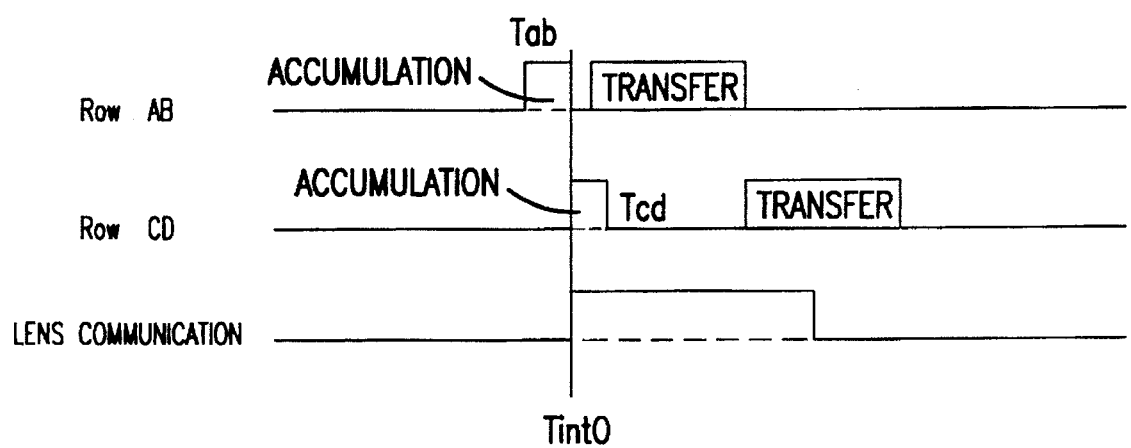
FIG. 4 is a graph that shows the accumulation timing of a third embodiment of the present invention.

As described above, by controlling the accumulation start and end times for the two areas of row AB and row CD in FIG. 4, the accumulation time intervals can be controlled. The accumulation time intervals for row AB and row CD are referred to as Tab and Tcd, respectively. These accumulation time intervals are computed from the past accumulation time intervals of each sensor and the sensor output at that time. In general, this procedure is referred to as soft automatic gain control (AGC). Because soft AGC is known, a detailed explanation is omitted.

Figure 1:
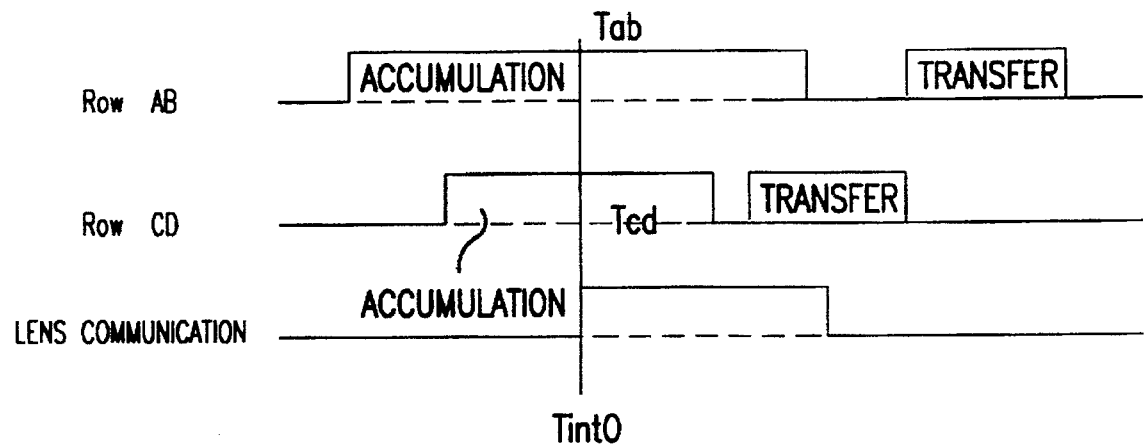
FIG. 1 is a graph that shows the accumulation timing of a first embodiment of the present invention.

In the case of condition 1, the accumulation starting and ending times for rows AB and CD are set so that the accumulation midpoint times become Tint0, as shown in FIG. 1. Condition 1 is expressed mathematically as:

$$Tab > Tth \text{ and } Tcd > Tth$$

where Tth is a reference accumulation time interval of a predetermined length.

Figure 8:
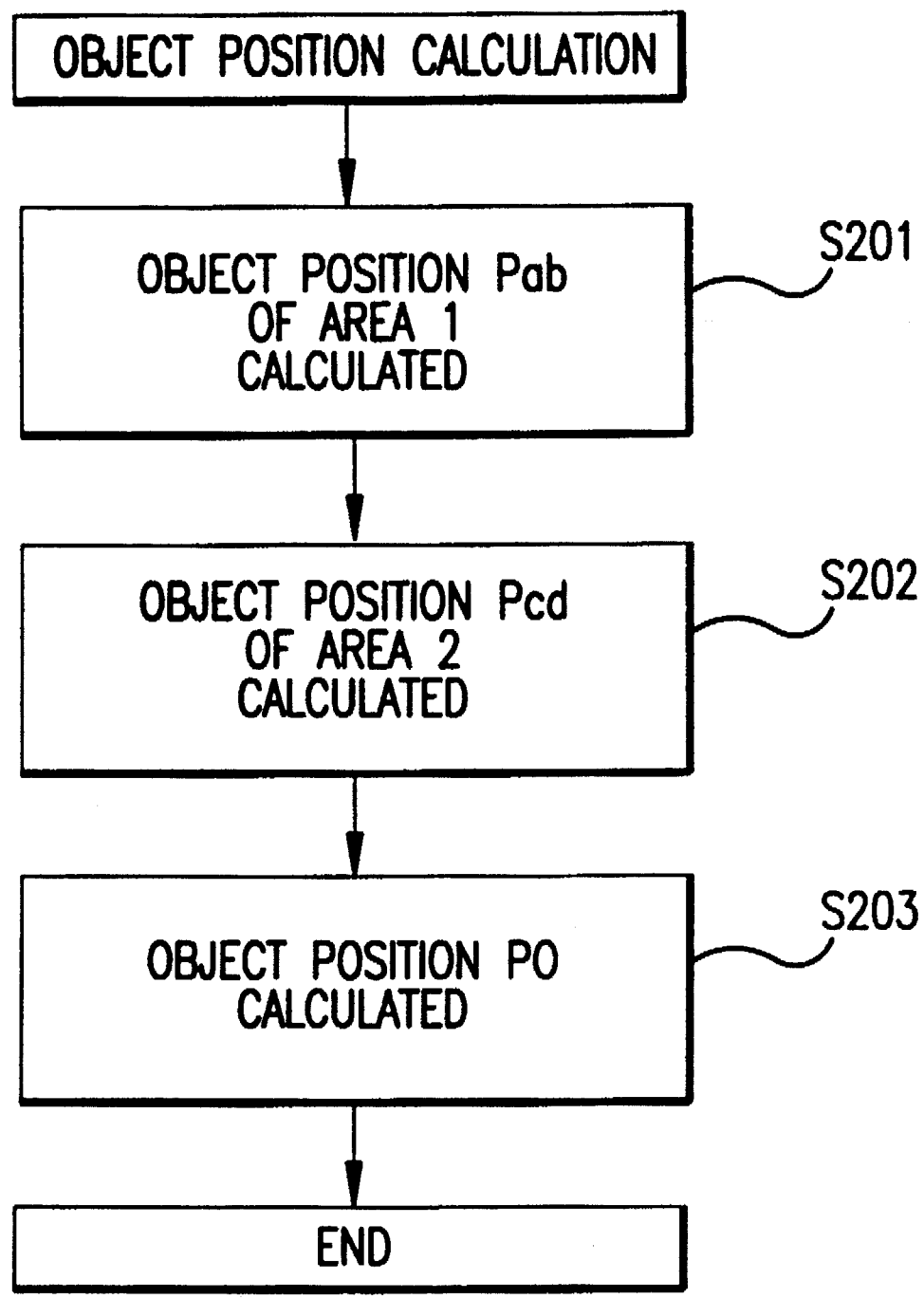
FIG. 8 is a flowchart that illustrates an object position calculation subroutine.
Figure 9:
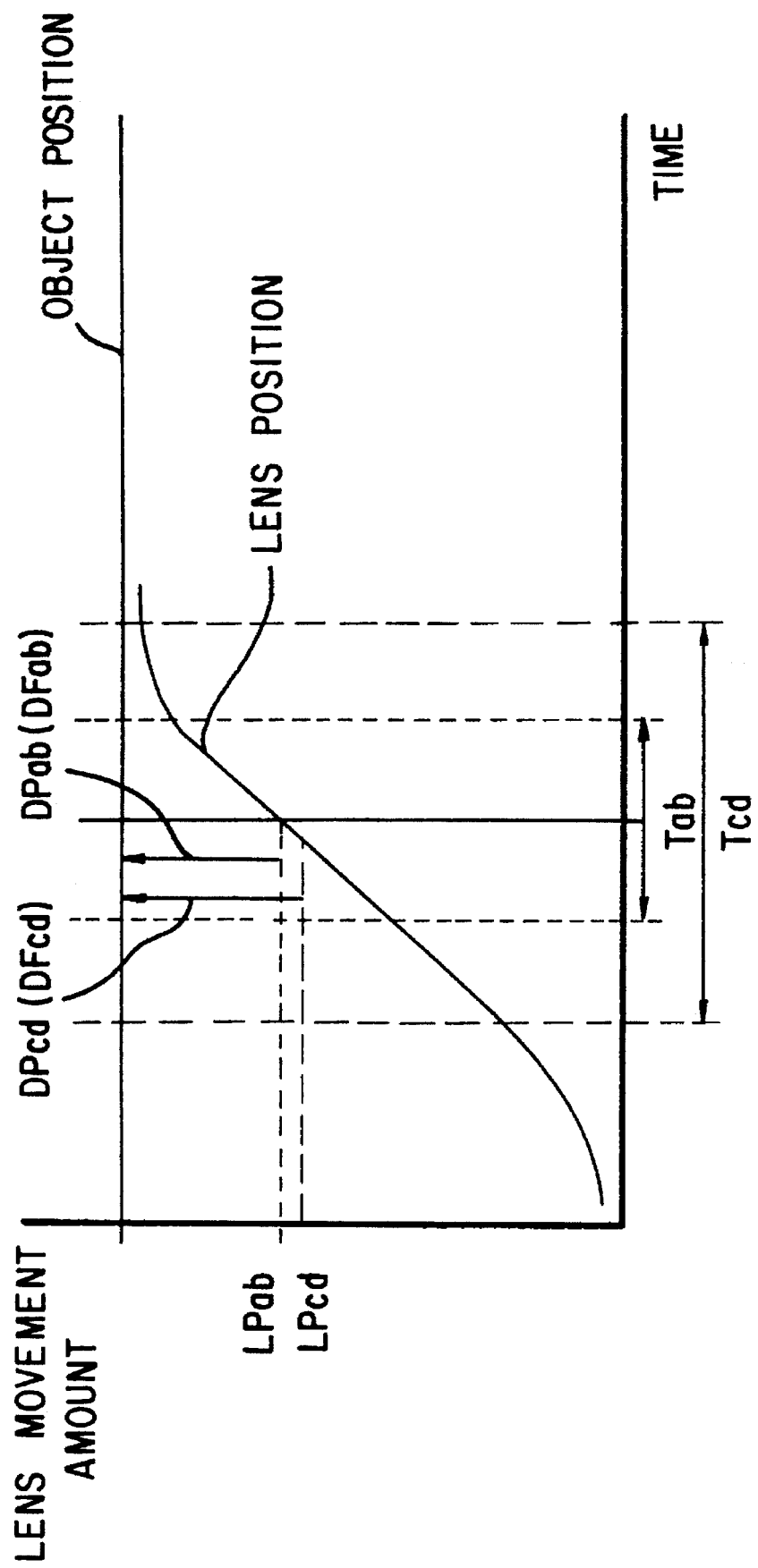
FIG. 9 is a graph that shows how detected defocus amounts are combined for multiple areas.

The object target position calculation subroutine is illustrated in FIGS. 8 and 9. In FIG. 9, the object is assumed to be stationary to simplify the explanation. The object target position P0 indicates the object position at accumulation midpoint time Tint0.

The object target position P0 is calculated as follows. First, the defocus amount DFab of area 1 is converted into $DP_{ab}$, which is the lens driving amount of the feedback pulse conversion. At this time, equation 1 is computed using two coefficients KL and L representing the defocus amount/lens driving amount conversion coefficients acquired at the current accumulation midpoint time and a lens driving amount pulse conversion coefficient KB (a value that remains constant for a particular camera body):

$$DP_{ab}=KB*KL*((DF_{ab})/(1-L*DF_{ab})) \quad (1)$$

Similarly, the lens driving amount of the feedback pulse conversion $DP_{cd}$ of area 2 is calculated as shown in equation 2:

$$DP_{cd}=KB*KL*((DF_{cd})/(1-L*DF_{cd})) \quad (2)$$

Because the lens driving amount calculated is the lens driving amount with respect to the average lens position during accumulation in each area, accurately calculating the target object positions of area 1 and area 2 is impossible without further modifying the values. However, the object target positions Pab and $P_{cd}$ can be accurately calculated (steps S201 and S202) by adding the average lens positions LPab and LPcd during each accumulation time to the lens driving amounts DPab and DPcd of each area. Accordingly, the object target position of each area is given by equations 3a and 3b:

$$P_{ab}=DP_{ab}+LP_{ab} \quad (3a)$$

$$P_{cd}=DP_{cd}+LP_{cd} \quad (3b)$$

In other words, the average lens position during accumulation in each area differs, and the detected defocus amounts are relative amounts from the average lens positions. Accordingly, combining or comparing the difference in defocus amounts in areas with different accumulation time intervals, with the exception of when the lens moves at the same speed during accumulation in each area or when the lens is halted, is not accurate.

An accurate object target position P0 can be obtained by combining the object target positions of each area as weighted by weighting coefficients α and β as shown in equation 4:

$$P0=\alpha*Pab+\beta*Pcd \quad (4)$$

The weighting coefficients may be changed according to the object contrast, the object brightness and the accumulation time interval or the like.

Figure 10:
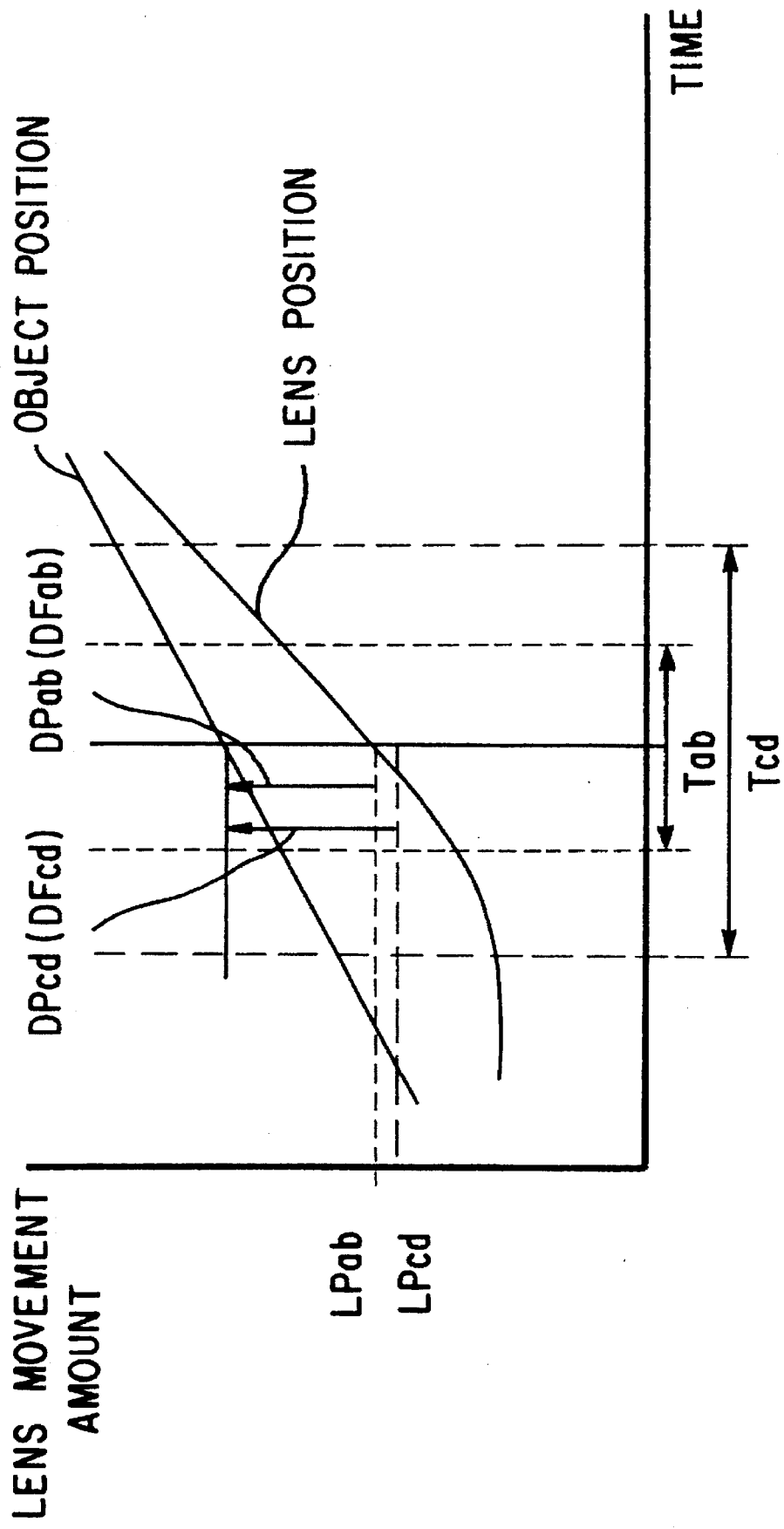
FIG. 10 is another graph that shows how detected defocus amounts are combined for a plurality of areas.

FIG. 10 shows the procedure described above in connection with FIG. 9, except for an object that is assumed to be moving. In the case of a focus state detection device that uses an accumulation type of photoelectric conversion device, the average object position during accumulation is detected accurately even if the object is moving. Accordingly, as shown in FIG. 10, when the object moves at a substantially constant speed during the accumulation time interval, the average object position during accumulation and the object position at the accumulation midpoint time match. For this reason, the amount of data recorded can be reduced by causing the accumulation midpoint times to match. Furthermore, in the case in which a difference exists between object positions in each area when the accumulation midpoint times differ, distinguishing whether the difference is created by the movement of one object or by separate objects is possible.

Figure 11:
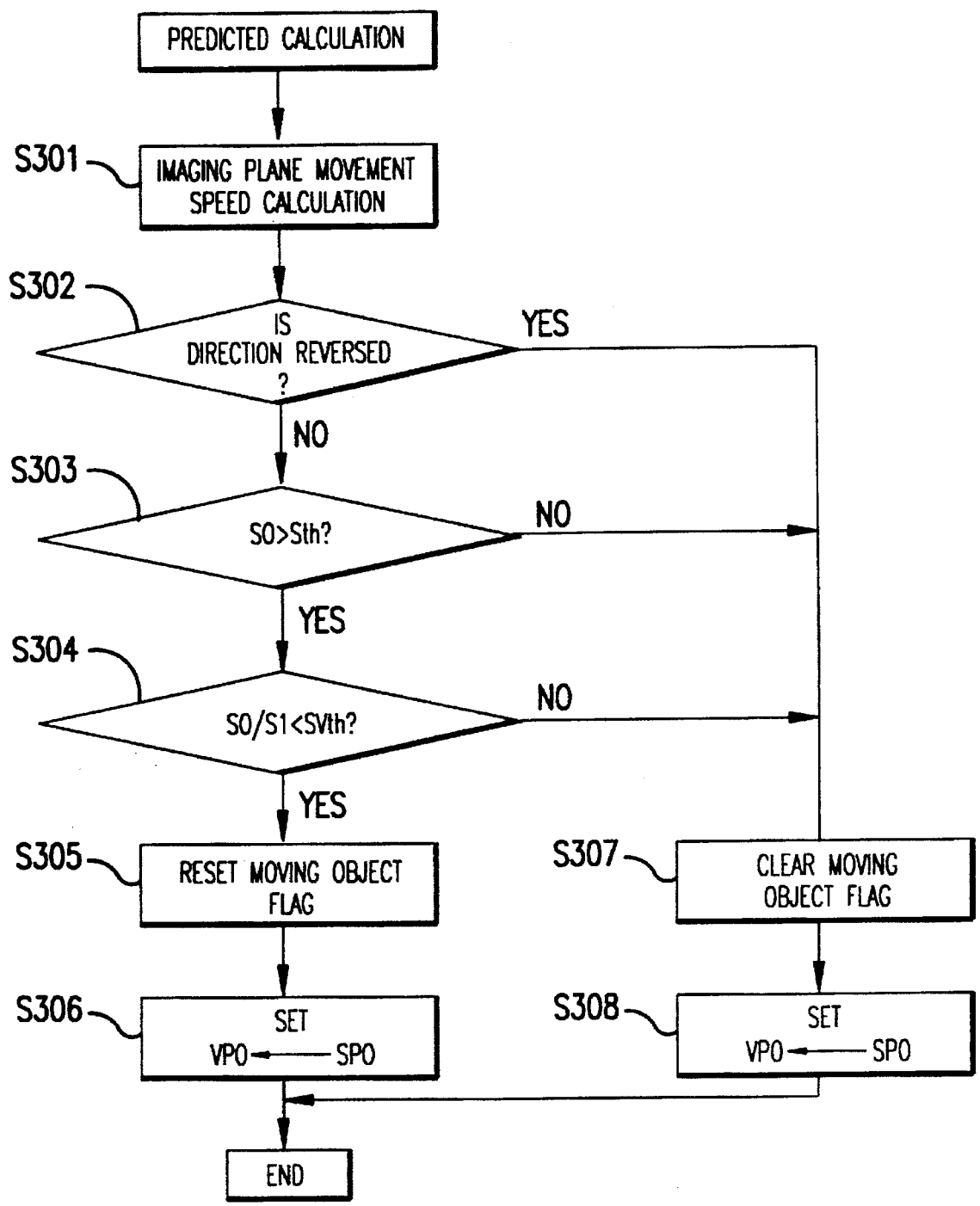
FIG. 11 is a flowchart that illustrates the predicted calculation subroutine.

FIG. 11 illustrates the predicted calculation subroutine. In step S301, the speed of change (i.e., the speed at which the in-focus position changes) of the lens position is calculated. The speed of change of the lens position is the speed needed to focus the lens on the object with a time interval different from the movement speed of the imaging plane (i.e., the imaging plane movement speed) resulting from the movement of the object when the position of the lens is assumed to be fixed. The imaging plane movement speed is used in a movement determination, whereas the in-focus position change speed is used in lens movement control.

Figure 12:
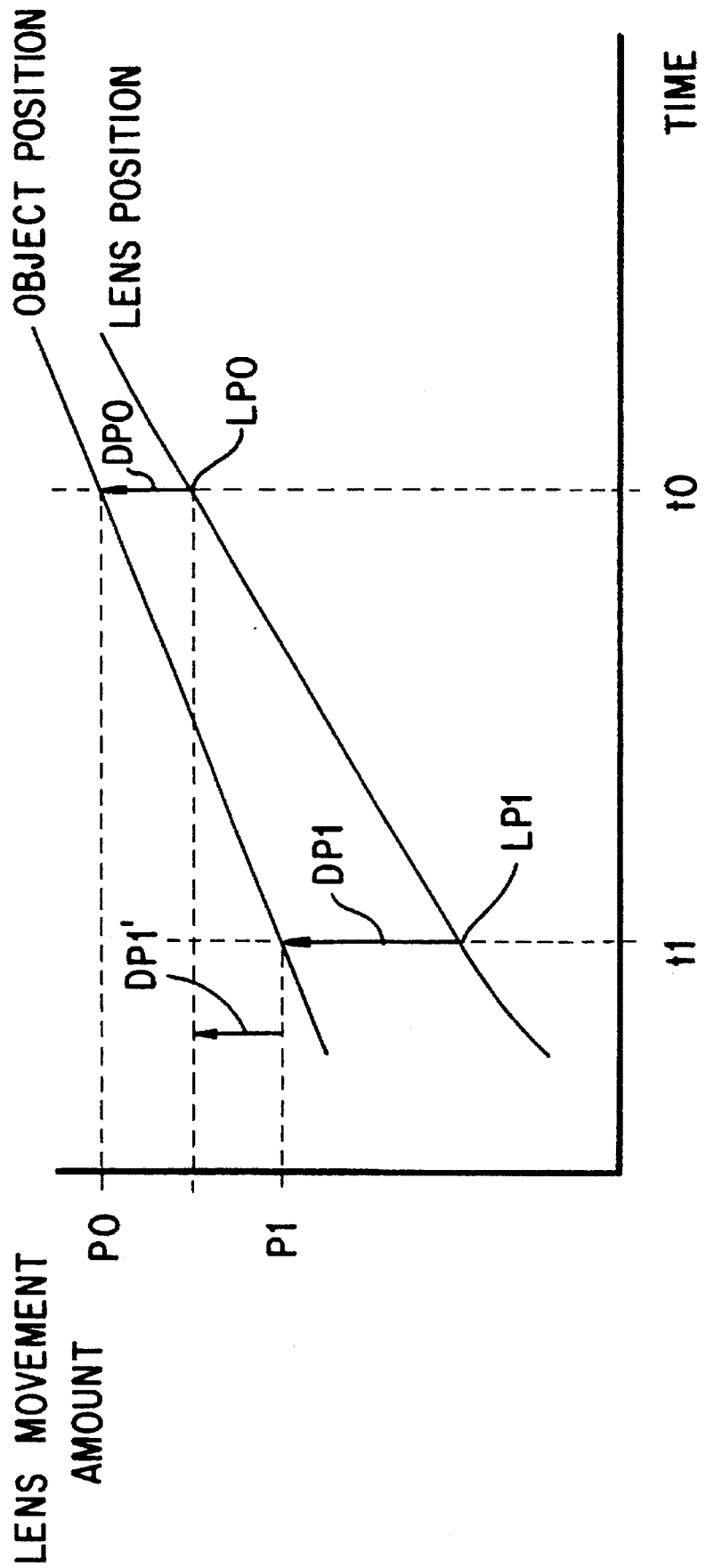
FIG. 12 is a graph that shows how the imaging plane movement speed is calculated.

The method of calculating the imaging plane movement speed and the in-focus position change speed is shown in FIG. 12. The defocus amount is a relative position with respect to the imaging plane of the object using the predetermined imaging plane as a reference. Because the change in the defocus amount caused by the movement of the lens differs depending upon the lens position, the relationship cannot be expressed as proportionally. Consequently, adding or subtracting the defocus amounts of locations of different lens positions does not produce accurate results.

To calculate the imaging plane movement speed, the relative value DP1' of the object position P1 at the previous accumulation midpoint time with respect to the lens position of the current accumulation midpoint time is calculated using equation 5:

$$DP1'=P1-LP0 \quad (5)$$

The relative value DP1' is converted into the corresponding defocus amount DF1' using the defocus amount/lens driving amount conversion coefficients as expressed in equation 6:

$$DF1'=DP1'/(KB*KL+DP1'*L) \quad (6)$$

The imaging plane movement speed is determined using equation 7 from the time interval between the current defocus amount DF0 and the defocus amount DF1' of the previous accumulation midpoint time with respect to the current accumulation midpoint time lens position:

$$S0=(DF0-DF1')/(t0-t1) \quad (7)$$

To combine the defocus amounts of the multiple areas of the present invention, the difference between the current accumulation midpoint lens position LP0 and the previous accumulation midpoint time object position P0 is converted into a defocus amount DF0 using the defocus amount/lens movement amount conversion coefficients. When only a single focus state detection area is of interest, or when the accumulation starting and ending times are the same (even when there are multiple focus state detection areas), the relative positions have been calculated, so performing this conversion to reverse calculate the defocus amount is unnecessary.

FIG. 12 shows the method of calculating the in-focus position change speed described in FIG. 11. The in-focus position change speed SP0 is the amount of change of the in-focus lens position per unit of time. The in-focus position change speed is calculated using equation 8 from the time interval between the lens position P1 required to focus the lens on the object at the previous accumulation midpoint time t1 and the lens position P0 required to focus the lens on the object at the current accumulation midpoint time t0:

$$SP0=(P0-P1)/(t0-t1) \tag{8}$$

As described above, the current and previous focus state detection results are used to calculate the imaging plane movement speed and the in-focus position change speed, but other methods are equally suitable. For example, the current values and the values before the previous values could also be used.

In step S302, a test is conducted to determine whether the directions of the imaging plane movement speed S0 calculated at the present time and the imaging plane movement speed S1 calculated at the previous time are reversed. If the directions are reversed, separate objects are detected (because one object leaves the focus state detection area and thus the movement direction reverses), or the object is not suitable for the predicted calculation. If the directions are reversed, the controller 7 advances to step S307, and the object is not recognized as a moving object. In step S303, a test is conducted to determine whether the current imaging plane movement speed S0 is at least as great as a predetermined value Sth. If the speed is not greater than the predetermined value Sth, the object is not moving, and the controller 7 advances to step S307. If the speed is greater than the predetermined value Sth, the controller 7 advances to step S304.

In step S304, the ratio of the current imaging plane movement speed S0 with respect to the previous imaging plane movement speed S1 is calculated (S0/S1), and a test is conducted to determine whether the ratio is within a predetermined range. If the ratio is within the predetermined range, the results of the current focus state detection are reliable, and the controller 7 advances to step S305. If the ratio is not within the predetermined range, the object is considered to have left the focus state detection area, and a separate object is considered to have been detected. Accordingly, the controller advances to step S307, and the object is not considered to be moving. In step S305, the moving object flag is set because the current determination is that the object is moving. In step S306, SP0 is substituted as the lens movement target speed VP0 used for controlling the lens. In step S307, the moving object flag is reset because the object is not considered to be moving or the object is stationary. In step S308, the lens movement target speed VP0 is set to 0.

Figure 13:
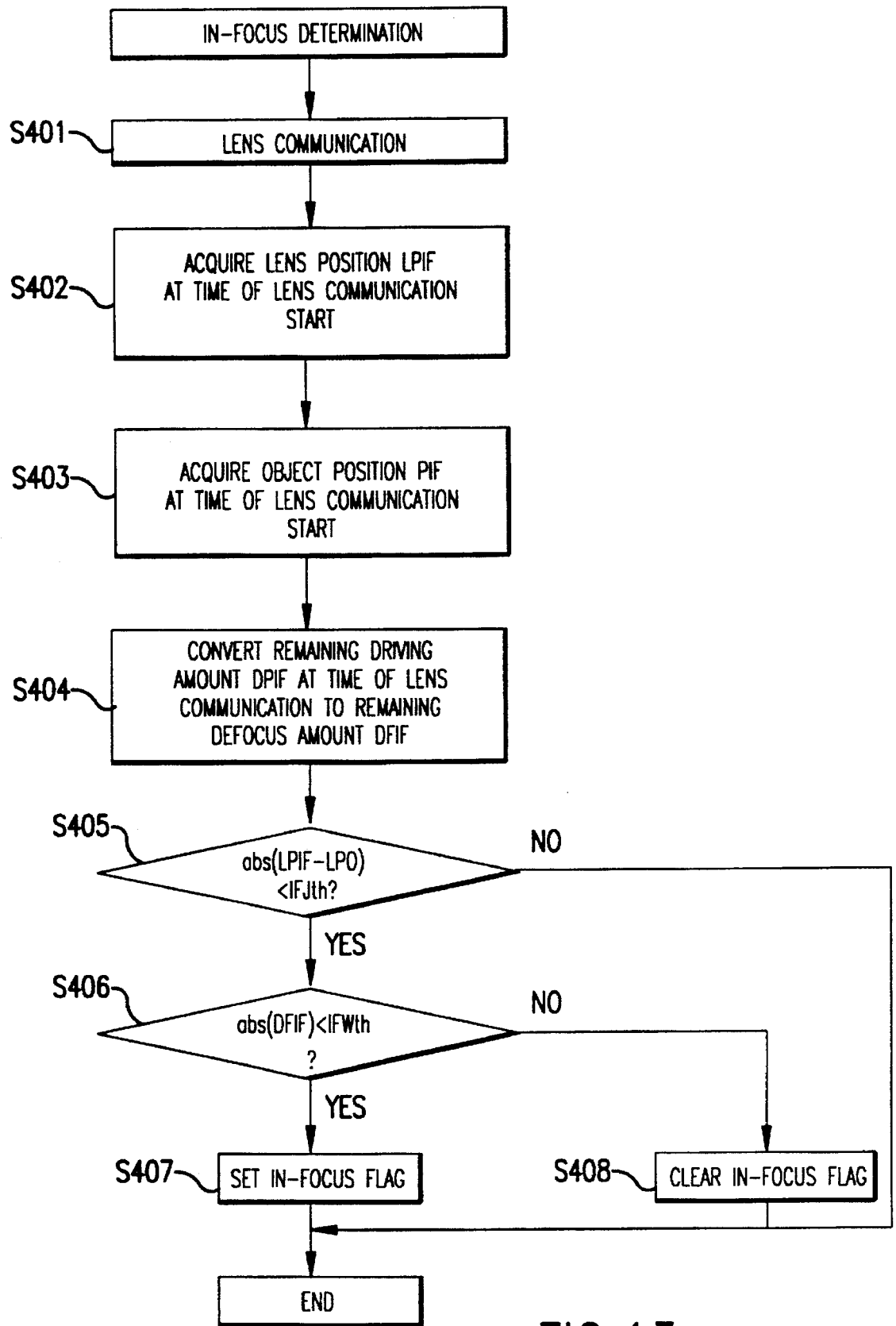
FIG. 13 is a flowchart that illustrates the in-focus determination subroutine.
Figure 14:
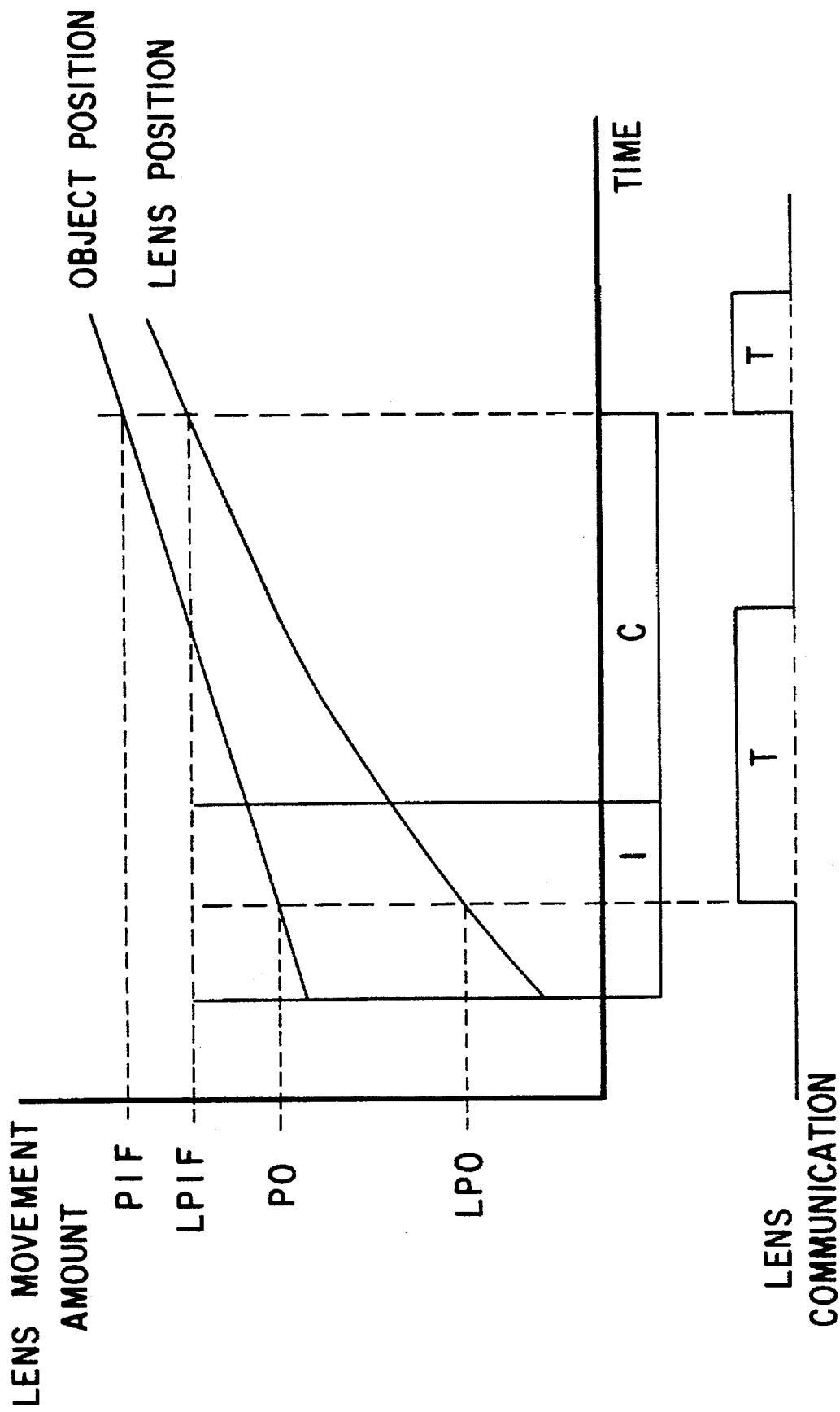
FIG. 14 is a graph that shows how the in-focus condition is determined.

FIG. 13 illustrates the in-focus determination subroutine. FIG. 14 shows the calculation of the defocus amount DFIF used in determining the in-focus condition as shown in FIG. 14. In FIG. 14, the letter T indicates the time interval over which communication with the lens (i.e., the exchange of data) occurs between the camera body and the lens. The letter I indicates time interval over which accumulation in the photoelectric conversion device occurs, and the letter C indicates the time interval over which the focus state detection algorithm occurs. To simplify the explanation, at least one of the two areas will be expressed with I during accumulation. In step S401, the defocus amount/lens movement amount conversion coefficients are received from the lens to calculate the defocus amount needed to achieve an in-focus condition. The defocus amount/lens movement amount conversion coefficients must be determined because they change depending on the lens position for some lenses. In step S402, the lens position LPIF at the lens communication starting time is retrieved. The lens position LPIF allows the defocus amount DFIF for an in-focus determination (the defocus amount at the lens communication start time) to be calculated. In step S403, the object position PIF at the lens communication start time is calculated using equation 9:

$$PIF=VP0*(tIF-t0)+P0 \tag{9}$$

In equation 9, tIF is the time at which communication with the lens commences in step S401. In step S404, the remaining driving amount DPIF at the time of the in-focus determination is calculated using equation 10:

$$DPIF=PIF-LPIF \tag{10}$$

The defocus amount DFIF for the in-focus determination is calculated using equation 11 with the remaining driving amount DPIF at the time of starting lens communication and the defocus amount/lens driving amount conversion coefficient obtained during lens communication in step S401:

$$DFIF=DPIF/(KB*KL+DPIF*L) \tag{11}$$

In step S405, a test is made to determine whether the lens movement amount from the current accumulation midpoint time through the time of in-focus determination is less than or equal to a predetermined value IFJth. When the lens movement amount is large, erroneous in-focus determinations due to calculation errors can result. Consequently, when the lens movement amount is larger than the predetermined value, the current in-focus determination is not conducted. In step S406, a test is made to determine whether the defocus amount DFIF at the time of in-focus determination is within the in-focus width IFWth. If the defocus amount is within the in-focus width, the controller advances to step S407, and the in-focus flag is set. If the defocus amount is not within the in-focus width, the controller advances to step S408, and the in-focus flag is cleared.

Figure 15:
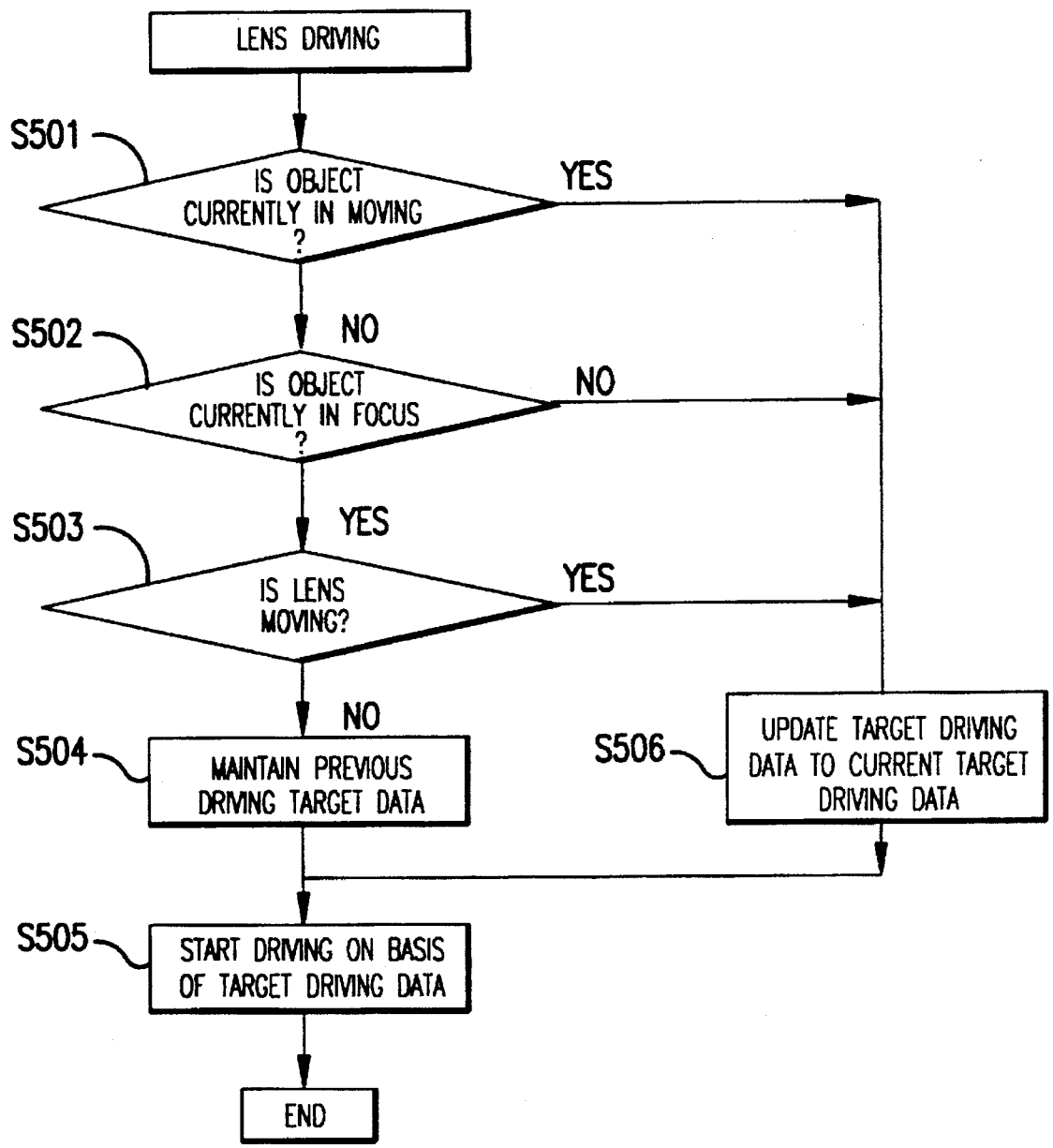
FIG. 15 is a flowchart that illustrates the lens driving subroutine.

FIG. 15 illustrates the lens driving subroutine. In step S501, a test is conducted to determine whether the current object is moving by verifying whether a moving object flag is set. If the object is moving, the data is updated to be the driving target data calculated at the present time because no halting of the lens driving due to in-focus determinations is occurring. The driving target data includes the object position P0 at the current accumulation midpoint time and the lens movement target speed VP0 at the present time. If the object is determined not to be moving, the controller advances to step S502. In step S502, if object is not in-focus, the data is updated to be the driving target data calculated at the present time in step S506. If the object is in-focus, the controller advances to step S503.

In step S503, a test is conducted to determine whether the lens is currently moving. If the lens is moving, the data is updated to be the driving target data calculated at the present time in step S506. During lens driving, the lens is driven promptly and without stopping at the position that would result in the defocus amount being zero, even if the defocus amount is within the in-focus width. In step S104, if the lens is not currently being driven, lens driving is not started. Consequently, the previous driving target data is maintained without being updated to the current driving target data. In step S505, the driving of the lens is initiated on the basis of the driving target data that has been established.

Figure 2:
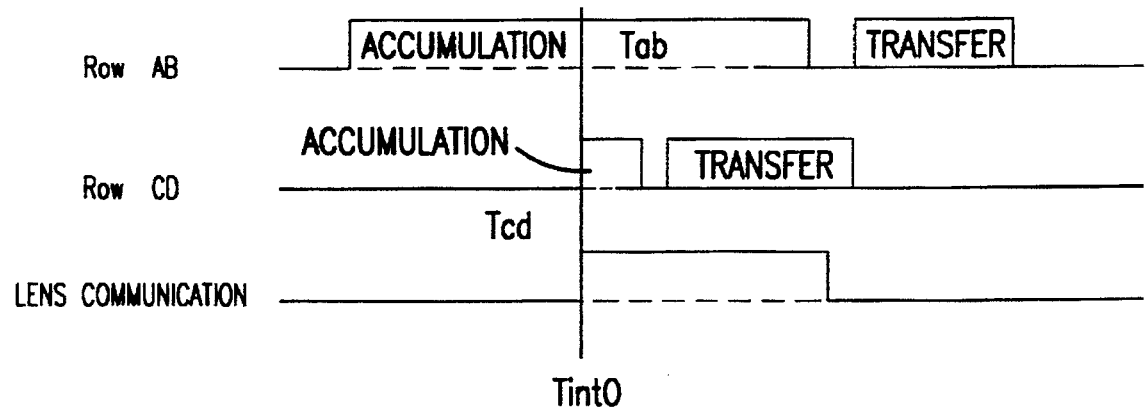
FIG. 2 is a graph that shows the accumulation timing of a first aspect of a second embodiment of the present invention.

In a second embodiment of the present invention, the accumulation midpoint time of the longer accumulation time interval is set to Tint0, whereas the accumulation starting time of the shorter time interval is set to the accumulation midpoint time Tint0 of the longer time interval, as shown in FIG. 2. Condition 2 is expressed mathematically as:

Tab>Tth and Tcd<Tth or

Tab<Tth and Tcd>Tth

As a result, control can be simplified when the accumulation time interval is extremely short. In FIG. 2, the accumulation time interval of row AB is longer than a predetermined value Tth in order to simplify the explanation. Correspondingly, if the accumulation time interval of row CD is longer, the accumulation time interval of row AB can be set to start at the accumulation midpoint time of row CD.

Figure 3:
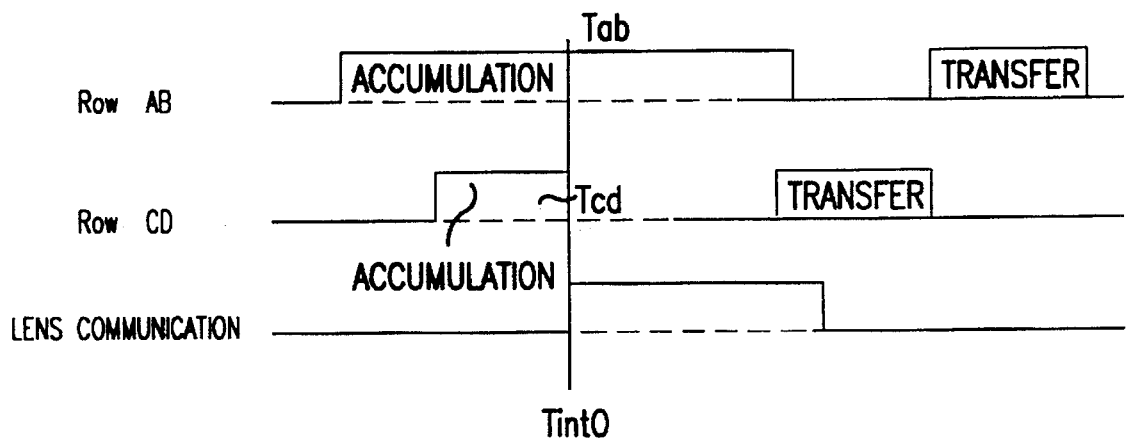
FIG. 3 is a graph that shows the accumulation timing of a second aspect of the second embodiment of the present invention.

According to another aspect of the second embodiment, the accumulation midpoint time of the longer accumulation time interval is set to Tint0, whereas the accumulation end time of the shorter time interval is set to the accumulation midpoint time Tint0 of the longer time interval, as shown in FIG. 3. As a result, control can be simplified when the accumulation time interval is extremely short, similar the method of FIG. 2. The method of lens driving used in the second embodiment substantially follows the same fundamental steps as the method described above in connection with the first embodiment.

In a third embodiment of the present invention, accumulation in each row is conducted sequentially because the accumulation time interval of each row is shorter than a predetermined time interval, as shown in FIG. 4. Condition 3 is expressed mathematically as:

Tab≦Tth and Tcd≦Tth

If the accumulation time intervals are short, a small shift in matching the accumulation midpoint time of a first accumulation time interval to the starting time, midpoint time or ending time of a second accumulation time interval produces a substantial error. Therefore, the ending time of the first accumulation time interval is matched to the starting time of the second accumulation time interval such that accumulation occurs sequentially.

The method of the third embodiment follows substantially the same steps described above in connection with the first embodiment, except for the following aspects. In the accumulation control subroutine, the average lens positions LPab and LPcd of each area are determined by counting the number of feedback pulses from the encoder 10 from the accumulation starting time to the ending time in each area to calculate the average lens position during accumulation. Lens communication begins at time Tint0 in order to acquire the lens information at the accumulation midpoint time Tint0 (the defocus amount/lens driving amount conversion coefficient, open F value and the like). The lens side is such that the lens information of the lens communication start time is sent. The lens position LPint0 at the accumulation midpoint time Tint0 is recorded.

In the present invention, because the defocus amounts of multiple areas are combined by matching the accumulation intervals for multiple areas of the photoelectric conversion device, recording the accumulation midpoint time of each area becomes unnecessary. Under one approach, the accumulation time intervals are matched by controlling the timing such that the accumulation midpoint time of a first accumulation time interval coincides with the starting time, the midpoint time or the ending time of a second accumulation time interval. Under a second approach, which is particularly suitable when the accumulation time intervals are short, the accumulation time intervals are matched by controlling the timing such that the ending time of a first accumulation time interval coincides with the starting time of a second accumulation time interval. As a result, memory capacity can be reduced. Furthermore, because time errors in the accumulation time interval do not exist, errors in speed detection do not arise. In other words, a moving object is not mistaken for a stationary object, and photographs that would be out of focus are not taken.

Although the invention is described in conjunction with specific embodiments thereof, many alternatives, modifications and variations will be apparent to those skilled in the art. Accordingly, the preferred embodiments of the invention as set forth above are intended to be illustrative, not limiting. Various changes to the invention may be made without departing from its true spirit and scope as defined in the following claims.

What is claimed is:

1. An automatic focus adjustment device, comprising:
   a photoelectric conversion device having a plurality of areas that receive light signals from a photographic optical system and convert said light signals into electrical signals by accumulating electric charge over accumulation time intervals;
   a focus state detection device connected to said photoelectric conversion device that receives and detects a focus adjustment state in accordance with said electrical signals; and
   a photoelectric conversion timing control device that controls said photoelectric conversion device to match a first midpoint time of a first accumulation time interval to substantially coincide with one of a starting time, a second midpoint time and an ending time of a second accumulation time interval.

2. The automatic focus adjustment device of claim 1, wherein said photoelectric conversion timing control device controls said photoelectric conversion device to match said first midpoint time of said first accumulation time interval to substantially coincide with said second midpoint time of said second accumulation time interval if said first accumulation time interval and said second accumulation time interval are greater than a predetermined duration.

3. The automatic focus adjustment device of claim 1, wherein said photoelectric conversion timing control device controls said photoelectric conversion device to match said first midpoint time of said first accumulation time interval to substantially coincide with one of said starting time and said ending time of said second accumulation time interval if one of said first accumulation time interval and said second accumulation time interval is greater than a predetermined length and the other of said first accumulation time interval and said second accumulation time interval is less than said predetermined length.

4. The automatic focus adjustment device of claim 1, wherein said photoelectric conversion timing control device controls said photoelectric conversion device such that a first midpoint time of said first accumulation time interval substantially coincides with a starting time of said second accumulation time interval.

5. The automatic focus adjustment device of claim 1, wherein said photoelectric conversion timing control device controls said photoelectric conversion device such that a first midpoint time of said first accumulation time interval substantially coincides with said second midpoint time of said second accumulation time interval.

6. The automatic focus adjustment device of claim 1, wherein said photoelectric conversion timing control device controls said photoelectric conversion device such that a first midpoint time of said first accumulation time interval substantially coincides with an ending time of said second accumulation time interval.

7. The automatic focus adjustment device of claim 1, wherein said photoelectric conversion timing control device controls said photoelectric conversion device such that an ending time of said first accumulation time interval substantially coincides with a starting time of said second accumulation time interval.

8. The automatic focus adjustment device of claim 1, wherein said photoelectric conversion timing control device controls said photoelectric conversion device such that an ending time of said first accumulation time interval substantially coincides with a starting time of a second accumulation time interval if said first accumulation time interval and said second accumulation time interval are not greater than a predetermined duration.

9. A camera having a photographic optical system and an automatic focus adjustment device, said automatic focus adjustment device comprising:
- a photoelectric conversion device having a plurality of areas that receive light signals from said photographic optical system and convert said light signals into electrical signals by accumulating electric charge over accumulation time intervals;
- a focus state detection device connected to said photoelectric conversion device that receives and detects a focus adjustment state in accordance with said electrical signals; and
- a photoelectric conversion timing control device that controls said photoelectric conversion device to match a first midpoint time of a first accumulation time interval to substantially coincide with one of a starting time, a second midpoint time and an ending time of a second accumulation time interval.

10. The camera of claim 1, wherein said photoelectric conversion timing control device controls said photoelectric conversion device to match said first midpoint time of said first accumulation time interval to substantially coincide with said second midpoint time of said second accumulation time interval if said first accumulation time interval and said second accumulation time interval are greater than a predetermined duration.

11. The camera of claim 1, wherein said photoelectric conversion timing control device controls said photoelectric conversion device to match said first midpoint time of said first accumulation time interval to substantially coincide with one of said starting time and said ending time of said second accumulation time interval if one of said first accumulation time interval and said second accumulation time interval is greater than a predetermined length and the other of said first accumulation time interval and said second accumulation time interval is less than said predetermined duration.

12. The camera of claim 1, wherein said photoelectric conversion timing control device controls said photoelectric conversion device such that a first midpoint time of said first accumulation time interval substantially coincides with a starting time of said second accumulation time interval.

13. The camera of claim 9, wherein said photoelectric conversion timing control device controls said photoelectric conversion device such that a first midpoint time of said first accumulation time interval substantially coincides with said second midpoint time of said second accumulation time interval.

14. The camera of claim 9, wherein said photoelectric conversion timing control device controls said photoelectric conversion device such that a first midpoint time of said first accumulation time interval substantially coincides with an ending time of said second accumulation time interval.

15. The camera of claim 9, wherein said photoelectric conversion timing control device controls said photoelectric conversion device such that an ending time of said first accumulation time interval substantially coincides with a starting time of said second accumulation time interval.

16. The camera of claim 9, wherein said photoelectric conversion timing control device controls said photoelectric conversion device such that a starting time of said first accumulation time interval substantially coincides with a starting time of a second accumulation time interval if said first accumulation time interval and said second accumulation time interval are not greater than a predetermined duration.

17. A method of focusing a camera, comprising:
- converting light signals received from a photographic optical system with a photoelectric conversion device into electrical signals by accumulating electric charge over accumulation time intervals in a plurality of areas on said photoelectric conversion device;
- detecting a focus adjustment state in accordance with said electrical signals with a focus state detection device connected to said photoelectric conversion device;
- controlling said photoelectric conversion device with a photoelectric conversion timing control device to match a first midpoint time of a first accumulation time interval to substantially coincide with one of a starting time, a second midpoint time and an ending time of a second accumulation time interval;
- determining a defocus amount required to focus said photographic optical system of said camera; and
- driving said photographic optical system in accordance with said defocus amount to focus said camera.

18. The method of claim 17, wherein said step of controlling includes comparing at least one of said first accumulation time interval and said second accumulation time interval to a reference accumulation time interval of a predetermined duration.

19. The method of claim 18, wherein said controlling step includes setting a first midpoint time of said first accumulation time interval to substantially coincide with a second midpoint time of said second accumulation time interval if said first accumulation time interval and said second accumulation time interval are greater than said predetermined duration.

20. The method of claim 18, wherein said controlling step includes setting a first midpoint time of said first accumulation time interval to substantially coincide with one of a starting time and an ending time of said second accumulation time interval if one of said first accumulation time interval and said second accumulation time interval is greater than said predetermined length and the other of said first accumulation time interval and said second accumulation time interval is less than said predetermined duration.

21. The method of claim 18, wherein said controlling step includes setting an ending time of said first accumulation time interval to substantially coincide with a starting time of said second accumulation time interval if said first accumulation time interval and said second accumulation time interval are not greater than said predetermined duration.

22. The method of claim 17, wherein said controlling step includes setting an ending time of said first accumulation time interval to substantially coincide with a starting time of said second accumulation time interval.

23. The automatic focus adjustment device of claim 1, wherein if a duration of said first accumulation time interval is different from a duration of said second accumulation time interval, said photoelectric conversion timing control device controls said photoelectric conversion device to match a first midpoint time of said first accumulation time interval to substantially coincide with a second midpoint time of said second accumulation time interval.

24. The camera of claim 9, wherein if a duration of said first accumulation time interval is different from a duration of said second accumulation time interval, said photoelectric conversion timing control device controls said photoelectric conversion device to match a first midpoint time of said first accumulation time interval to substantially coincide with a second midpoint time of said second accumulation time interval.

25. The method of claim 17, wherein said controlling step includes setting a first midpoint time of said first accumulation time interval to substantially coincide with a second midpoint time of said second accumulation time interval if a duration of said first accumulation time interval is different from a duration of said second accumulation time interval.

26. The automatic focus adjustment device of claim 1, wherein the first midpoint time is determined based on a longest accumulation time interval selected among accumulation time intervals of the plurality of areas.

27. The camera of claim 9, wherein the first midpoint time is determined based on a longest accumulation time interval selected among accumulation time intervals of the plurality of areas.

28. The method of claim 17, wherein said controlling step includes determining the first midpoint time based on a longest accumulation time interval selected among accumulation time intervals of the plurality of areas.

* * * * *